(12) United States Patent
Kim et al.

(10) Patent No.: US 9,798,066 B2
(45) Date of Patent: Oct. 24, 2017

(54) DISPLAY DEVICE AND LIGHT GUIDE PLATE THEREOF

(71) Applicant: New Optics, Ltd, Yangju-si (KR)

(72) Inventors: Dong-Yong Kim, Cheonan-si (KR); Jong-Moon Yoon, Yangju-si (KR); Min-Kyoung Park, Seoul (KR)

(73) Assignee: New Optics, Ltd, Yangju-si (KR)

( * ) Notice: Subject to any disclaimer, the term of this patent is extended or adjusted under 35 U.S.C. 154(b) by 73 days.

(21) Appl. No.: 14/828,699

(22) Filed: Aug. 18, 2015

(65) Prior Publication Data

US 2016/0047972 A1 Feb. 18, 2016

Related U.S. Application Data

(60) Provisional application No. 62/038,723, filed on Aug. 18, 2014.

(30) Foreign Application Priority Data

Mar. 31, 2015 (KR) .................. 10-2015-0045736
Mar. 31, 2015 (KR) .................. 10-2015-0045738

(51) Int. Cl.
*G02B 6/36* (2006.01)
*F21V 8/00* (2006.01)

(52) U.S. Cl.
CPC .......... *G02B 6/0045* (2013.01); *G02B 6/0055* (2013.01); *G02B 6/0036* (2013.01); *G02B 6/0065* (2013.01)

(58) Field of Classification Search
CPC .. G02B 6/0055; G02B 6/0045; G02B 6/0036; G02B 6/0065; G02B 6/0016; G02B 6/0018; G02B 6/002; G02B 6/0031; G02B 6/0038; G02B 6/004; G02B 6/0041; G02B 6/0043; G02B 6/005; G02B 6/00
See application file for complete search history.

(56) References Cited

U.S. PATENT DOCUMENTS

| | | | | |
|---|---|---|---|---|
| 4,431,272 A * | 2/1984 | Yazawa | ............ | G02F 1/133553 349/113 |
| 4,519,686 A * | 5/1985 | Seki | ............ | G03B 13/24 359/454 |
| 5,506,924 A * | 4/1996 | Inoue | ............ | G02B 6/0038 385/129 |
| 5,841,496 A * | 11/1998 | Itoh | ............ | G02F 1/133553 349/113 |
| 6,097,458 A * | 8/2000 | Tsuda | ............ | G02F 1/133553 349/106 |
| 6,204,903 B1 * | 3/2001 | Hayashi | ............ | G02B 5/00 349/113 |

(Continued)

*Primary Examiner* — Elmito Breval
*Assistant Examiner* — Fatima Farokhrooz

(57) ABSTRACT

The present invention relates to a display device and a light guide plate thereof. According to an aspect of the present invention, there is provided a display device, including: a display panel configured to output an image to a front surface of the display device; a light source array arranged along at least one edge of the display device to output light; and a light guide plate arranged behind the display panel to guide light incident upon a side surface facing the edge from the light source array so that the light is projected through a front surface toward the display panel.

11 Claims, 12 Drawing Sheets

(56) References Cited

U.S. PATENT DOCUMENTS

| | | | | |
|---|---|---|---|---|
| 6,774,964 B2* | 8/2004 | Funamoto | G02F 1/133553 | 349/113 |
| 2002/0001189 A1* | 1/2002 | Egawa | G02B 6/0028 | 362/610 |
| 2002/0085150 A1* | 7/2002 | Funamoto | G02F 1/133553 | 349/113 |
| 2002/0159009 A1* | 10/2002 | Funamoto | G02F 1/133553 | 349/113 |
| 2004/0032659 A1* | 2/2004 | Drinkwater | F21V 33/006 | 359/558 |
| 2004/0051826 A1* | 3/2004 | Lee | G02F 1/133553 | 349/113 |
| 2004/0105157 A1* | 6/2004 | Matsushita | G02B 5/021 | 359/584 |
| 2004/0141304 A1* | 7/2004 | Nagakubo | G02B 6/0038 | 362/612 |
| 2004/0145915 A1* | 7/2004 | Kim | G02B 6/0036 | 362/559 |
| 2005/0243575 A1* | 11/2005 | Kunimochi | G02B 6/0038 | 362/606 |
| 2005/0270802 A1* | 12/2005 | Hsu | G02F 1/133615 | 362/626 |
| 2008/0025688 A1* | 1/2008 | Lee | G02B 6/0038 | 385/146 |
| 2008/0278659 A1* | 11/2008 | Park | G02B 6/002 | 349/65 |
| 2011/0228556 A1* | 9/2011 | Wang | G02B 6/0036 | 362/606 |
| 2012/0201045 A1* | 8/2012 | Gotou | G02B 6/0061 | 362/602 |
| 2012/0327685 A1* | 12/2012 | Song | G02B 6/0036 | 362/607 |
| 2013/0058130 A1* | 3/2013 | Hu | G02B 6/0055 | 362/613 |
| 2013/0242613 A1* | 9/2013 | Kurata | G02B 6/0035 | 362/613 |
| 2014/0240839 A1* | 8/2014 | Yang | G02B 3/0043 | 359/599 |
| 2014/0367873 A1* | 12/2014 | Yang | G02B 5/0215 | 264/2.5 |
| 2016/0313494 A1* | 10/2016 | Hamilton | G02B 6/0068 | |

* cited by examiner

DISPLAY DEVICE AND LIGHT GUIDE PLATE THEREOF

RELATED APPLICATIONS

This application claims the benefit of priority of U.S. Provisional Patent Application No. 62/038,723 filed on Aug. 18, 2014, and Korean Patent Application Nos. 10-2015-0045736 and 10-2015-0045738, both filed on Mar. 31, 2015. The contents of the above applications are all incorporated by reference as if fully set forth herein in their entirety.

FIELD AND BACKGROUND OF THE INVENTION

The present invention relates to a display device and a light guide plate thereof, and more particularly, to a display device with improved uniformity in luminance and a light guide plate thereof.

As a type of a light source device supplying light behind a screen of a liquid crystal display device, a backlight unit (BLU) is a core part that not only directly affects image quality such as luminance of image, color reproducibility, field of view, a ratio of light and shade, readability, etc., power consumption, product life, and the like, but also occupies about 20 to 50% of an overall unit price of a liquid crystal display device.

The backlight unit is mainly classified into a direct-lit type and an edge-lit type in accordance with a form of light source arrangement. The direct-lit type uses light projected toward a liquid crystal panel from a light source arranged right behind a screen, whereas in the edge-lit type, a light guide plate guides light projected toward a side direction from a light source arranged at an edge of a screen toward a liquid crystal panel to supply light to a display panel. Due to the structural difference, the direct-lit type is favorable to luminance, a ratio of light and shade, screen uniformity, image reproducibility, etc., whereas the edge-lit type is advantageous in terms of the thickness or cost of a product.

Recently, in the display industry, as a value of a display product as an interior design piece has become important, the percentage of an edge-lit backlight that has a great advantage in terms of an appearance of a product is gradually increasing. In particular, consumer demand for an extremely thin display product is increasing, and to keep pace with the trend, vigorous study has been carried out to minimize the number of diffusion sheets inserted behind a display panel since three to five diffusion sheets had been inserted behind the display panel. However, a display product with the minimum number of diffusion sheets cannot secure a light diffusion rate as before. Accordingly, uniformity in luminance of an output image is degraded, causing a hot spot to be noticeable.

SUMMARY OF THE INVENTION

The present invention is directed to providing a display device with improved uniformity in luminance and a light guide plate thereof.

According to an aspect of the present invention, there is provided a display device, including: a display panel configured to output an image to a front surface of the display device; a light source array arranged along at least one edge of the display device to output light; and a light guide plate arranged behind the display panel to guide light incident upon a side surface facing the edge from the light source array so that the light is projected through a front surface toward the display panel. Here, a reflective pattern for reflecting light to the front surface of the light guide plate is provided at a rear surface of the light guide plate. In addition, the reflective pattern includes a central embossed portion protruding toward an outer portion of the rear surface; a concave portion recessed toward an inner portion of the rear surface to surround the central embossed portion; and an outer embossed portion protruding toward the outer portion of the rear surface outside the concave portion. In addition, the outer embossed portion is provided to have the protruding height of a region abutting the edge to be greater than those of other regions.

Furthermore, according to another aspect of the present invention, there is provided a display device, including: a display panel configured to output an image to a front surface of the display device; a light source array arranged along at least one edge of the display device to output light; and a light guide plate arranged behind the display panel to guide light incident upon a side surface facing the edge from the light source array so that the light is projected through a front surface toward the display panel. In addition, a reflective pattern for reflecting light to the front surface of the light guide plate is provided at a rear surface of the light guide plate. In addition, the reflective pattern includes a central embossed portion protruding toward an outer portion of the rear surface; a concave portion recessed toward an inner portion of the rear surface to surround the central embossed portion; and an outer embossed portion protruding toward the outer portion of the rear surface outside the concave portion. In addition, the outer embossed portion is provided to have the protruding height lowered in accordance with a direction in which the light source array irradiates light.

Furthermore, according to still another aspect of the present invention, there is provided a display device, including: a display panel configured to output an image to a front surface of the display device; a light source array arranged along at least one edge of the display device to output light; and a light guide plate arranged behind the display panel to guide light incident upon a side surface facing the edge from the light source array so that the light is projected through a front surface toward the display panel. A reflective pattern for reflecting light to the front surface of the light guide plate is provided at a rear surface of the light guide plate. In addition, the reflective pattern includes a central embossed portion protruding toward an outer portion of the rear surface; a concave portion recessed toward an inner portion of the rear surface to surround the central embossed portion; and an outer embossed portion protruding toward the outer portion of the rear surface outside the concave portion. Here, the outer embossed portion has regions with different protruding heights, and a region with the greatest protruding height is arranged in the vertical direction of the display device from the center of the reflective pattern to prevent horizontal field of view of the display device from being degraded.

According to the present invention, an asymmetrical reflective pattern is arranged in accordance with the arrangement of the light source array to increase scattering of light with respect to a light incident direction, thereby improving uniformity in luminance throughout a display panel.

DESCRIPTION OF SPECIFIC EMBODIMENTS OF THE INVENTION

Figure 1:
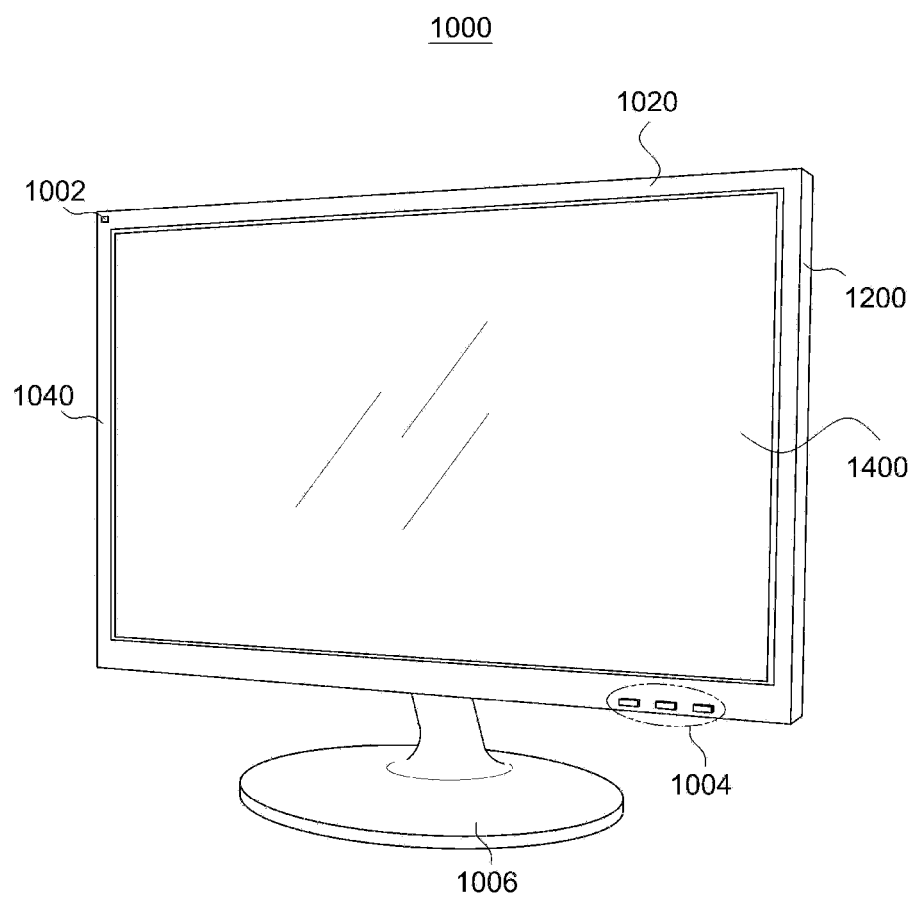
FIG. 1 is a perspective view of a display device according to an embodiment of the present invention.

Hereinafter, a display device and a light guide plate thereof according to an embodiment of the present invention will be described in detail with reference to the accompanying drawings.

In addition, like or similar reference numerals will be given to like or corresponding elements regardless of symbols in the drawings and duplicate description thereof will be omitted. The size and shape of each element shown in the drawings may be exaggerated or reduced for convenience in providing the description.

According to an aspect of the present invention, there is provided a display device, including: a display panel configured to output an image to a front surface of the display device; a light source array arranged along at least one edge of the display device to output light; and a light guide plate arranged behind the display panel to guide light incident upon a side surface facing the edge from the light source array so that the light is projected through a front surface toward the display panel. Here, a reflective pattern for reflecting light to the front surface of the light guide plate is provided at a rear surface of the light guide plate. In addition, the reflective pattern includes a central embossed portion protruding toward an outer portion of the rear surface; a concave portion recessed toward an inner portion of the rear surface to surround the central embossed portion; and an outer embossed portion protruding toward the outer portion of the rear surface outside the concave portion. In addition, the outer embossed portion is provided to have the protruding height of a region abutting the edge to be greater than those of other regions.

The light source array may be arranged at a short side edge of the display device, and the outer embossed portion of the reflective pattern may be provided to have the protruding height changed along a long side of the display device.

Furthermore, the light source array may be arranged at a long side edge of the display device, and the outer embossed portion of the reflective pattern may be provided to have the protruding height changed along a short side of the display device.

Furthermore, in the outer embossed portion, the protruding height of a region farthest from the edge may be lower than those of other regions.

Furthermore, in the outer embossed portion, the protruding height may be progressively lowered from a region abutting the edge to the region farthest from the edge.

Furthermore, in the reflective pattern, when viewed from a direction perpendicular to a rear surface, the central embossed portion may be formed in a circular shape, the concave portion may be formed in the shape of a ring surrounding the central embossed portion, and the outer embossed portion may be formed in the shape of a ring surrounding the concave portion.

Furthermore, in the outer embossed portion, the thickness of a ring at a region abutting the edge may be greater than that of a ring at other regions.

Furthermore, the central embossed portion may include a recessed region recessed at the central portion.

Furthermore, the recessed region may have a long axis parallel with the edge.

Furthermore, in the central embossed portion, the protruding height of a region nearby the edge may be greater than that of a region far from the edge with respect to the recessed region.

Furthermore, at the reflective surface, the density of the reflective pattern may progressively increase as becoming farther from the edge.

Furthermore, the density of the reflective pattern may be the greatest at a corner portion of the reflective surface abutting the edge.

Furthermore, according to another aspect of the present invention, there is provided a display device, including: a display panel configured to output an image to a front surface of the display device; a light source array arranged along at least one edge of the display device to output light; and a light guide plate arranged behind the display panel to guide light incident upon a side surface facing the edge from the light source array so that the light is projected through a front surface toward the display panel. In addition, a reflective pattern for reflecting light to the front surface of the light guide plate is provided at a rear surface of the light guide plate. In addition, the reflective pattern includes a central embossed portion protruding toward an outer portion of the rear surface; a concave portion recessed toward an inner portion of the rear surface to surround the central embossed portion; and an outer embossed portion protruding toward the outer portion of the rear surface outside the concave portion. In addition, the outer embossed portion is provided to have the protruding height lowered in accordance with a direction in which the light source array irradiates light.

In the reflective pattern, the central embossed portion may be formed in a circular shape, the concave portion may be formed in the shape of a ring surrounding the central embossed portion, and the outer embossed portion may be formed in the shape of a ring surrounding the concave portion. The thickness of a ring forming the shape of the outer embossed portion may decrease in accordance with the direction in which the light source array irradiates light.

Furthermore, according to still another aspect of the present invention, there is provided a display device, including: a display panel configured to output an image to a front surface of the display device; a light source array arranged along at least one edge of the display device to output light; and a light guide plate arranged behind the display panel to guide light incident upon a side surface facing the edge from the light source array so that the light is projected through a front surface toward the display panel. A reflective pattern for reflecting light to the front surface of the light guide plate is provided at a rear surface of the light guide plate. In addition, the reflective pattern includes a central embossed portion protruding toward an outer portion of the rear surface; a concave portion recessed toward an inner portion of the rear surface to surround the central embossed portion; and an outer embossed portion protruding toward the outer portion of the rear surface outside the concave portion. Here, the outer embossed portion has regions with different protruding heights, and a region with the greatest protruding height is arranged in the vertical direction of the display device from the center of the reflective pattern to prevent horizontal field of view of the display device from being degraded.

Furthermore, in the outer embossed portion, the region with the greatest protruding height may be arranged in lower direction of the display device from the center of the reflective pattern to prevent upper field of view of the display device from being degraded.

Furthermore, the light source array may be arranged at a lower edge of the display device so that light proceeds to the reflective pattern through the region with the greatest protruding height to increase scattering of light by the reflective pattern.

Furthermore, the light source array may be arranged at an edge in the same direction as the region with the greatest protruding height from the center of the reflective pattern in the display device so that light proceeds to the reflective pattern through the region with the greatest protruding height to increase scattering of light by the reflective pattern.

Furthermore, in the outer embossed portion, a region with the lowest protruding height may be arranged toward a reflective direction of the region with the greatest protruding height from the center of the reflective pattern.

Furthermore, in the outer embossed portion, the protruding heights of regions facing each other along the vertical direction of the display device from the center of the reflective pattern may be substantially formed equal to each other to improve the horizontal field of view of the display device.

Hereinafter, description on a display device 1000 according to an embodiment of the present invention will be given.

FIG. 1 is a perspective view of a display device 1000 according to an embodiment of the present invention.

Referring to FIG. 1, the display device 1000 is a device outputting an image.

Generally, as depicted in FIG. 1, the display device 1000 can output an image through a rectangular display panel 1400 having a horizontal long side 1020 and a vertical short side 1040. In addition, the display device 1000 may include a sensor unit 1002 receiving a command such as turning on or turning off power, changing a channel, or adjusting volume in accordance with a user input, or detecting illuminance; a button unit 1004 directly receiving the input; and a speaker unit (not shown in the drawings) outputting a voice. In addition, a stand type display device 1000 may further include a support unit 1006 supporting the display device 1000 so that the display device 1000 is mounted on a shelf, and the like.

The display device 1000 should be construed as a comprehensive term that includes a liquid crystal display (LCD) device, a plasma display panel (PDP) device, and an organic light-emitting diode (OLED) display device and various other display devices 1000 outputting an image. However, hereinafter, description will be mainly given on a liquid crystal display device 1000 for convenience. In addition, even though a display device 1000 realized by a flat panel display (FPD) is shown in FIG. 1, the display device 1000 of the present invention may also be realized by a curved display.

Figure 2:
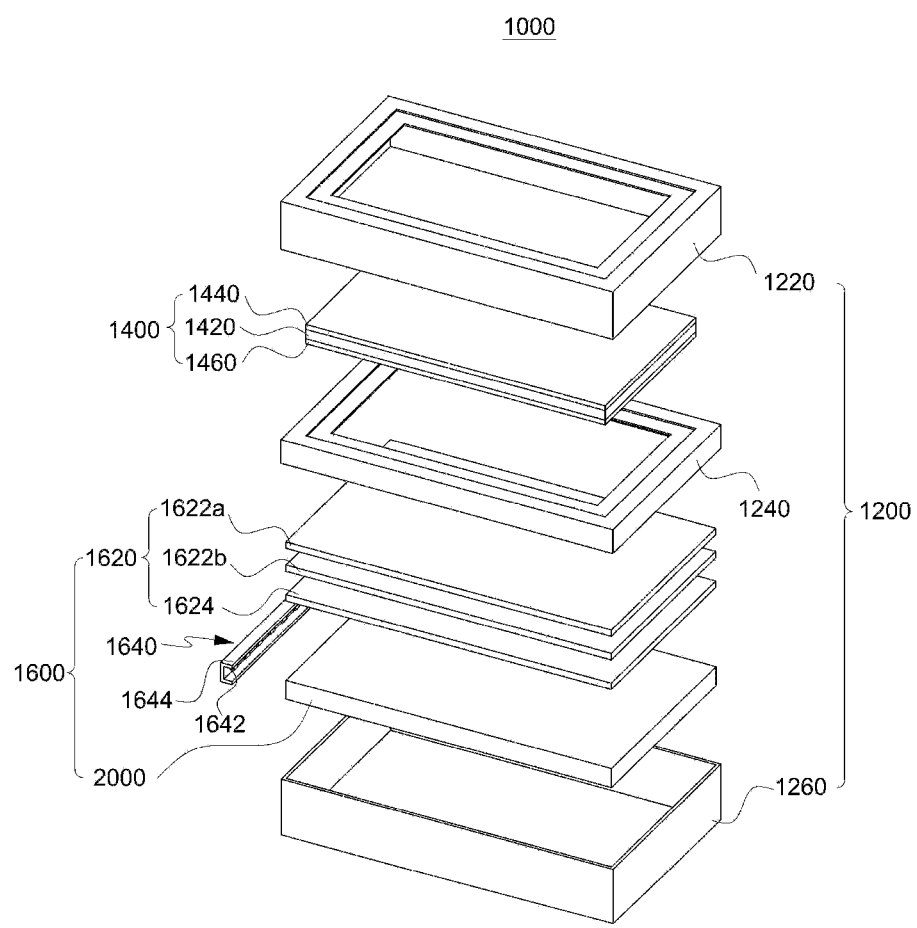
FIG. 2 is an exploded perspective view of a display device according to an embodiment of the present invention.
Figure 3:
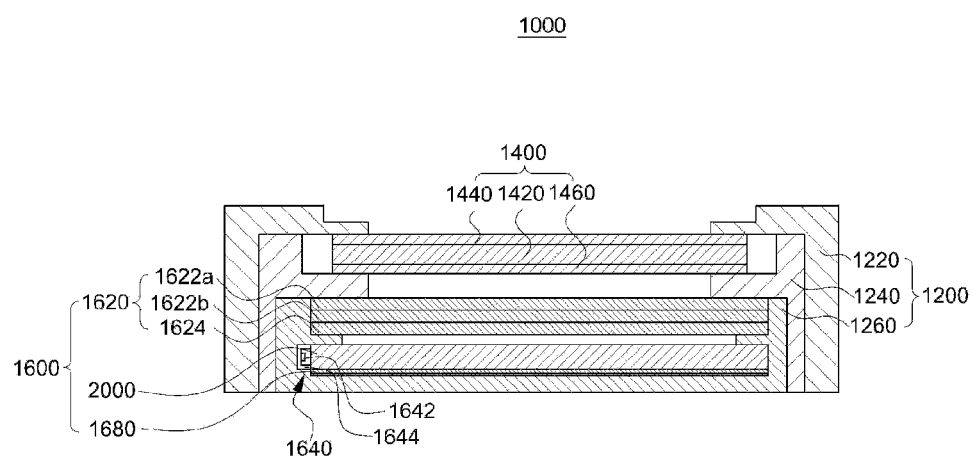
FIG. 3 is a cross-sectional view of a display device according to an embodiment of the present invention.

FIG. 2 is an exploded perspective view of a display device 1000 according to an embodiment of the present invention, and FIG. 3 is a cross-sectional view of a display device 1000 according to an embodiment of the present invention.

Referring to FIG. 2 and FIG. 3, the display device 1000 may include a housing 1200, a display panel 1400, and a backlight unit 1600.

The housing 1200 accommodates the display panel 1400 and the backlight unit 1600 therein to protect them from external impact. In addition, the housing 1200 has a function of matching the display panel 1400 with the backlight unit 1600.

The housing 1200 may include a top case 1220, a guide frame 1240, and a bottom cover 1260. The top case 1220 and the bottom cover 1260 are coupled to each other to respectively cover a front surface and a rear surface of the display device 1000, and the guide frame 1240 is mounted between the two. The guide frame 1240 may fixate the display panel 1400 with a bezel of the top case 1220 and fixate a light guide plate 2000 and optical sheets 1620 with the bottom cover 1260.

The display panel 1400 displays an image using light supplied from the backlight unit 1600.

The display panel 1400 may include two transparent substrates and a liquid crystal layer 1420 inserted between the two. Here, the transparent substrates may be a color filter substrate 1460 and a thin film transistor (TFT) substrate 1440, respectively. If an electrical signal is applied to the liquid crystal layer 1420 through a gate line and a data line of the thin film transistor substrate 1440, the liquid crystal arrangement is changed, and the liquid crystal layer 1420 selectively transmits light projected from the backlight unit 1600 in units of pixels. The transmitted light is colored by the color filter substrate 1460 to output an image. Here, the thin film transistor substrate 1440 may be electrically connected to a panel driver (not shown in the drawings) such as a chip on film (COF) or a tape carrier package (TCP) through a printed circuit board (PCB, not shown in the drawings) to receive a control signal.

The backlight unit 1600 supplies light behind the display panel 1400 so that the display panel 1400 can output an image.

The backlight unit 1600 may include the optical sheets 1620, a light source array 1640, the light guide plate 2000, and a reflective sheet 1680.

The light source array 1640 may include a light source 1642 generating light and a light source substrate 1644 in which the light source 1642 is installed. For the light source 1642, a cold cathode fluorescent lamp (CCFL), an external electrode fluorescent lamp (EEFL), or a light-emitting diode (LED) may be used. In case of an edge-lit backlight unit 1600, the light source array 1640 may have the light source 1642 installed at an edge portion of the display device 1000 to face a side direction so that light is incident upon a side surface of the light guide plate 2000. In case of a direct-lit backlight unit 1600, the light source 1642 may be installed at the bottom cover 1260 to output light toward a rear portion of the display panel 1400. Here, the light source substrate 1644 may be installed at the bottom cover 1260, or the light source 1642 may be directly installed at the bottom cover 1260 without the light source substrate 1644.

In the display device 1000, the light source array 1640 may be installed along a long side 2002 substantially formed in the same direction as a long side edge 1020 of the display device 1000 or a short side 2004 substantially formed in the same direction as a short side edge 1040 of the display device 1000.

Figure 4:
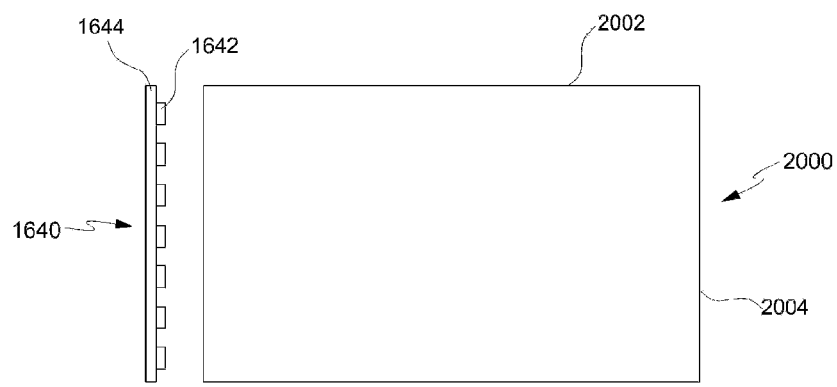
FIG. 4 is a planar view of a first example of an arrangement of a light source array according to an embodiment of the present invention.
Figure 5:
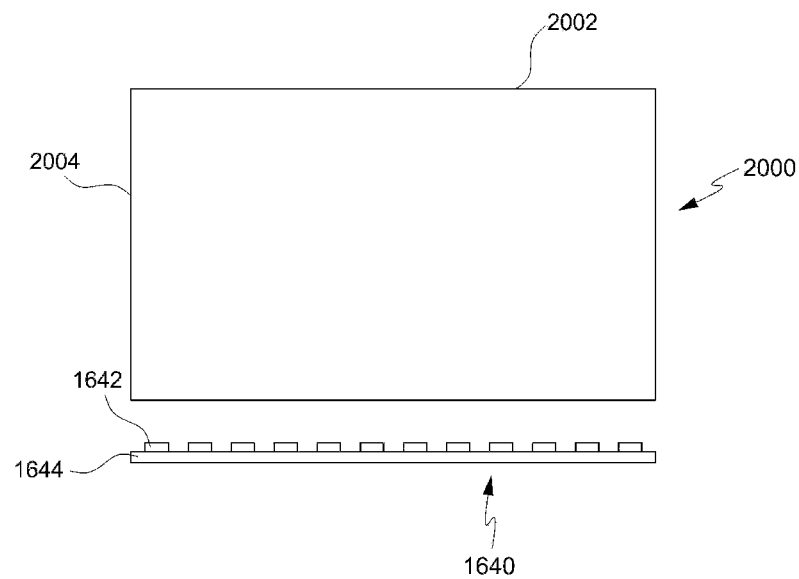
FIG. 5 is a planar view of a second example of an arrangement of a light source array according to an embodiment of the present invention.

FIG. 4 is a planar view of a first example of an arrangement of a light source array 1640 according to an embodiment of the present invention, and FIG. 5 is a planar view of a second example of an arrangement of a light source array 1640 according to an embodiment of the present invention.

Referring to FIG. 4, the light source array 1640 may be installed along the short side edge 1040 of the display device 1000. Specifically, the light source substrate 1644 may be installed at the bottom cover 1260 along the short side edge 1040 of the display device 1000, and a plurality of light sources 1642 may be arranged at the light source substrate 1644 along the short side edge 1040. The light sources 1642 may be arranged in equidistant intervals or variable intervals as needed. The light sources 1642 may irradiate light toward the side of the long side edge 1020 of the display device 1000 so that light is incident upon an inner portion of the light guide plate 2000 through a side surface of the light guide plate 2000.

Referring to FIG. 5, the light source array 1640 may be installed along the long side edge 1020 of the display device 1000. Specifically, the light source substrate 1644 may be installed at the bottom cover 1260 along the long side edge 1020 of the display device 1000, and a plurality of light sources 1642 may be arranged at the light source substrate 1644 along the long side edge 1020. The light sources 1642 may be arranged in equidistant intervals or variable intervals as needed. The light sources 1642 may irradiate light toward the side of the short side edge 1040 of the display device 1000 so that light is incident upon an inner portion of the light guide plate 2000 through a side surface of the light guide plate 2000.

The light guide plate 2000 may be arranged in the edge-lit backlight unit 1600 to face a rear portion of the display panel 1400. The light guide plate 2000 guides the light outputted toward the side direction from the light sources 1642 toward the display panel 1400. In addition, to improve optical uniformity by improving luminance or a hot spot, patterns may be respectively formed on the top surface and the bottom surface of the light guide plate 2000 and side surfaces of the light sources 1642, and polymethyl methacrylate (PMMA), mild steel (MS), methyl methacrylate (MMA), and glass may be used as material of the light guide plate 2000. More specific description on the light guide plate 2000 will be given later. Meanwhile, in the case of the direct-lit backlight unit 1600, a diffusion plate diffusing light may be included instead of the light guide plate 2000 guiding light.

The optical sheets 1620 may be arranged at the rear portion of the display panel 1400 to face the display panel 1400, or between the display panel 1400 and the light guide plate 2000 when the light guide plate 2000 is present. The optical sheets 1620 may be a diffusion sheet 1624 or a prism sheet 1622. The diffusion sheet 1624 evenly diffuses light outputted from the light guide plate 2000 or a diffusion plate to improve uniformity of light output distribution, and is capable of mitigating or removing a dark/bright pattern similar to a moire phenomenon or a hot spot. The prism sheet 1622 may adjust an optical path in a direction perpendicular to the display panel 1400. The light passed through the light guide plate 2000 or the diffusion sheet 1624 is scattered and proceeded in all directions. The prism sheet 1622 enables the scattered light to be projected in a direction perpendicular to the display panel 1400, thereby improving luminance and field of view of the display device 1000. According to one example, as depicted in FIG. 2 and FIG. 3, a vertical prism sheet 1622a, a horizontal prism sheet 1622b, and the diffusion sheet 1624 may be arranged from a portion nearby the display panel 1400 as the optical sheets 1620. The optical sheets 1620 may not be arranged in the order mentioned above. In other words, some of the optical sheets 1620 may be omitted, some may be more than one (for example, two or more diffusion sheets 1624 may be arranged), or the order may be properly changed as needed.

The reflective sheet 1680 may be attached to the bottom cover 1260. The reflective sheet 1680 may reflect light proceeding to a rear portion of the light outputted from the light sources 1642 toward the display panel 1400. The reflective sheet 1680 reflects light projected toward a rear surface of the light guide plate 2000 or diffusion plate toward the display panel 1400, thereby improving luminance of an overall display device by reducing optical loss.

Hereinafter, the light guide plate 2000 according to an embodiment of the present invention will be described in more detail.

Figure 6:
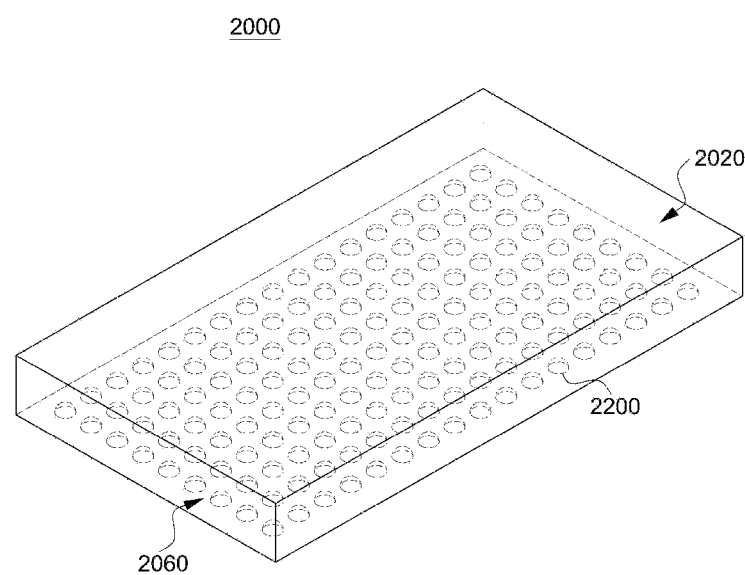
FIG. 6 is a perspective of a light guide plate according to an embodiment of the present invention.

FIG. 6 is a perspective view of the light guide plate 2000 according to an embodiment of the present invention.

Referring to FIG. 6, the light guide plate 2000 may be provided in a shape of a plate. Accordingly, the light guide plate 2000 may have a pair of primary surfaces and side surfaces connecting the primary surfaces. A top surface close to the display panel 1400 of the pair of primary surfaces is a light output surface 2020, and the opposite surface becomes a reflective surface 2040 reflecting light. In addition, one surface among the side surfaces is arranged to face the light sources 1642 to become a light incident surface 2060. Generally, since the display device 1000 has a quadrilateral screen, the light guide plate 2000 may be formed in a shape of a quadrilateral plate to correspond to the screen of the display device 1000. In the case of the light guide plate 2000 formed in the shape of a quadrilateral plate, any one surface among four side surfaces, a pair of surfaces vertically facing each other, or a pair of surfaces horizontally facing each other may be the light incident surface 2060. Meanwhile, even though it is depicted in FIG. 6 that the light guide plate 2000 is a flat plate with uniform thickness overall, the thickness does not have to be uniform at all times. For example, it is possible that a region nearby a side surface facing the light sources 1642 is formed thicker than other regions in the light guide plate 2000.

The light guide plate 2000 receives light projected from the light sources 1642 through the light incident surface 2060 to guide the light at the inner portion of the light guide plate 2000, thereby outputting the light in the form of surface light sources 1642 through the light output surface 2020. The reflective surface 2040 performs a role of reflecting light exiting to the rear surface of the light guide plate 2000 toward the light output surface 2020. Patterns for effectively performing light incidence, light guidance, and light reflection may be respectively formed at the light incident surface 2060, the light output surface 2020, and the reflective surface 2040. In particular, at the reflective surface 2040, a reflective pattern 2200 to reflect light exiting to the rear surface of the light guide plate 2000, i.e. the reflective surface 2040, may be formed.

On the reflective surface 2040, a plurality of reflective patterns 2200 may be formed. The reflective patterns 2200 may be formed by silk screening, printing, laser etching, depositing, pressing, roll stamping, and the like. By the processes, the reflective patterns 2200 may be formed in a particular shape to effectively refract or reflect light exiting to the rear surface of the light guide plate 2000 toward the light output surface 2020. Detailed description on the shape of the reflective patterns 2200 will be provided later.

Figure 7:
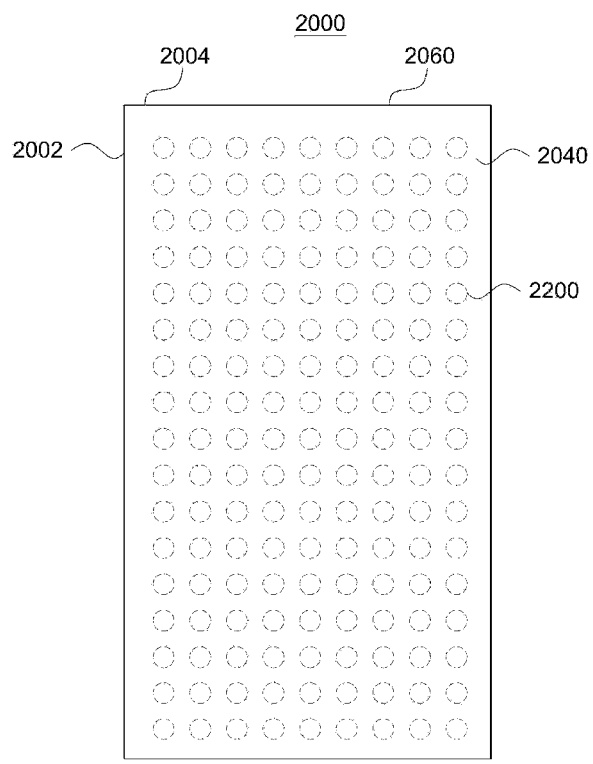
FIG. 7 is a planar view of a light guide plate with uniform density of a reflective pattern according to an embodiment of the present invention.
Figure 8:
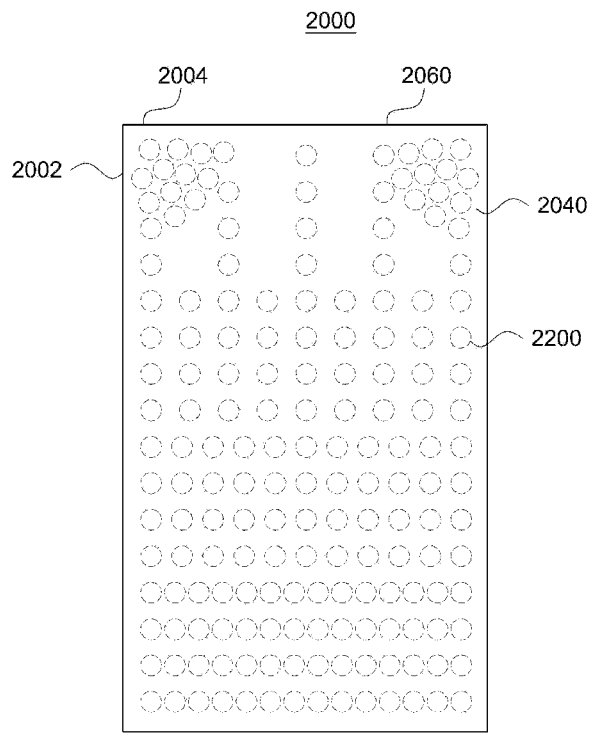
FIG. 8 and FIG. 9 are planar views of a light guide plate with non-uniform density of a reflective pattern according to an embodiment of the present invention.
Figure 9:
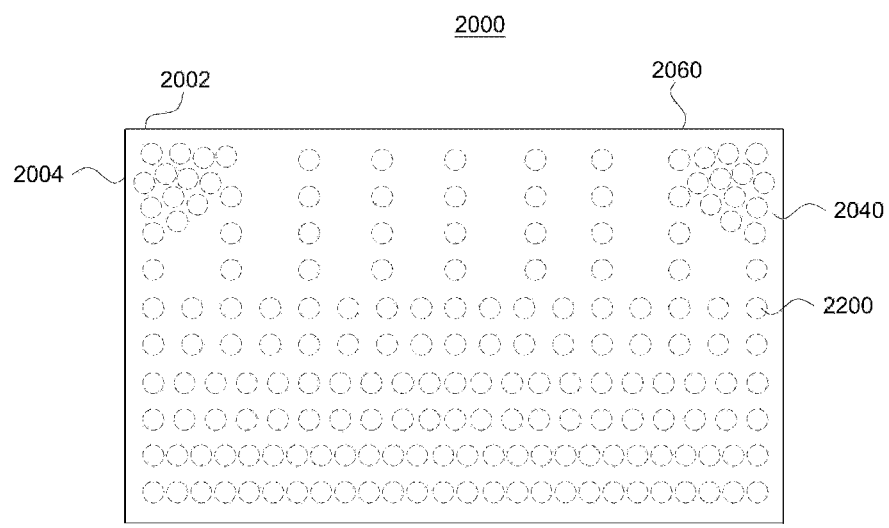

FIG. 7 is a planar view of a light guide plate 2000 with uniform density of the reflective patterns 2200 according to an embodiment of the present invention, and FIG. 8 and FIG. 9 are planar views of a light guide plate 2000 with non-uniform density of the reflective patterns 2200 according to an embodiment of the present invention.

According to one example, as depicted in FIG. 7, the reflective patterns 2200 may be formed in uniform density at the reflective surface 2040. When forming the reflective patterns 2200 in uniform density at the reflective surface 2040, compatibility is high since a process of forming the same patterns may be applied regardless of the number of inches of the display device 1000, and compared with forming the reflective patterns 2200 in non-uniform density, the process is simple, thereby saving the manufacturing cost.

According to another example, the reflective patterns 2200 may be formed in non-uniform density at the reflective surface 2040. Specifically, the density of the reflective patterns 2200 may be increased progressively from the light incident surface 2060 to an opposite light surface (a side surface of the light guide plate 2000 positioned at the opposite side of the light incident surface). In other words, the coverage rate and size of the reflective patterns 2200 may be increased progressively from the light incident surface 2060 to the opposite light surface, or intervals may be decreased. In addition, the density of the reflective patterns 2200 may be relatively extremely increased at a corner portion nearby the light incident surface 2060.

In FIG. 8, the arrangement of the reflective patterns 2200 when the light source array 1640 is arranged at the short side edge 1040 of the display device 1000 is depicted, and in FIG. 9, the arrangement of the reflective patterns 2200 when the light source array 1640 is arranged at the long side edge 1020 of the display device 1000 is depicted.

The amount of light incident from the light source array 1640 is relatively great at a region close to the light incident surface 2060 inside the light guide plate 2000, and the amount of incident light progressively decreases toward the opposite light surface. As stated above, if the reflective patterns 2200 are arranged more densely at a region far from the light incident surface 2060 than in a region close to the light incident surface 2060, the difference in the amount of incident light is reduced, thereby mitigating the difference in luminance. In addition, the corner portion may lack in the amount of light due to having a shape in which a light source at one side is omitted compared with other regions. By increasing the density of the reflective patterns 2200 at the corner portion, a phenomenon in which a dark portion is generated at the corner portion can also be mitigated.

Meanwhile, at the light incident surface 2060 of the light guide plate 2000, a serration pattern 2400 to improve a distribution angle of light incident from the light sources 1642 and a diffusion effect may be formed. The serration pattern 2400 may be formed at the light incident surface 2060 so that an embossed portion and a concave portion extending in a vertical direction are repetitively arranged in the width direction of the light incident surface 2060. In addition, at the light output surface 2020 of the light guide plate 2000, a light guide pattern 2600 to guide light incident upon the light incident surface 2060 throughout the light guide plate 2000 may be formed. The light guide pattern 2600 is repetitively formed at the light output surface 2020 to extend in a direction perpendicular to the light incident surface 2060 and may have a lenticular pattern or be formed in a triangular or rectangular prism pattern.

Figure 10:
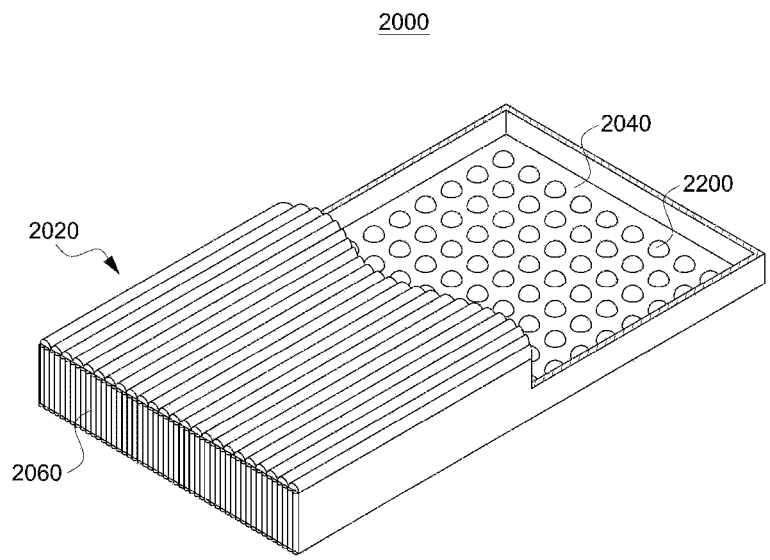
FIG. 10 and FIG. 11 are perspective views of a light guide plate according to a modification of the present invention.
Figure 11:
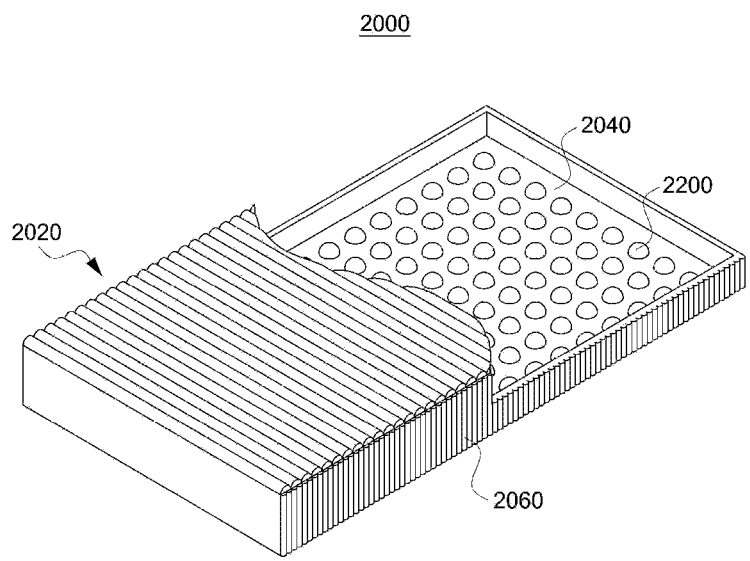

FIG. 10 and FIG. 11 are perspective views of a light guide plate according to a modification of the present invention.

Referring to FIG. 10, it is shown that, when the light incident surface 2060 is at the short side edge 1040, the serration pattern 2400 is formed at a surface facing the short side edge 1040, and the light guide pattern 2600 extends along the long side edge 1020 of the light guide plate 2000. Similarly, referring to FIG. 11, it is shown that, when the light incident surface 2060 is at the long side edge 1020, the serration pattern 2400 is formed at a surface facing the long side edge 1020, and the light guide pattern 2600 extends along the short side edge 1040 of the light guide plate 2000.

The serration pattern 2400 or the light guide pattern 2600 may be provided at the light guide plate 2000 with the reflective patterns 2200, and it is possible that the serration pattern 2400, the light guide pattern 2600, and the reflective patterns 2200 are all formed at the light guide plate 2000, or any one of them is omitted.

Hereinafter, reflective patterns 2200 according to an embodiment of the present invention will be described.

The reflective patterns 2200 are protruded or recessed from the reflective surface 2040 to be formed in a particular shape, thereby reflecting light exiting to the rear surface of the light guide plate 2000. If light is reflected as such, the amount of light outputted by the light output surface 2020 of the light guide plate 2000 increases as a result, thereby increasing luminance of the display device 1000.

In the present invention, the reflective patterns 2200 can be basically provided in a dot pattern. Overall, when viewed in a direction perpendicular to the reflective surface 2040, the reflective patterns 2200 may have a portion protruding in a circular shape on the reflective surface 2040, a portion recessed while surrounding the protruding region, and a portion protruding while surrounding the recessed portion.

The reflective patterns 2200 may be mainly formed by roll stamping or pressing. Specifically, the recessed portion may be formed by digging the reflective surface 2040 by roll stamping or pressing, and the protruding portion can be formed as the recessed portion is pushed toward surrounding portions. Here, if the roll stamping or pressing is performed by a thermal pressing method, patterns can be formed effectively.

The reflective patterns 2200 reflect, refract, or scatter light incident from the light incident surface 2060 to proceed to the reflective surface 2040 or light reflected from the light output surface 2020 to proceed to the reflective surface 2040 in each of the regions, thereby effectively reflecting light.

Specifically, the reflective patterns 2200 primarily refract, scatter, diffuse, and reflect light at the outer protruding portion, and the recessed portion and the central protruding portion can refract, scatter, diffuse, and reflect the light again. In particular, the outer protruding portion primarily scatters light incident upon the reflective patterns 2200, thereby causing an overall increase in uniformity of luminance at the light output surface 2020.

Hereinafter, a first example among various shapes of reflective patterns 2200 according to an embodiment of the present invention will be described.

Figure 12:
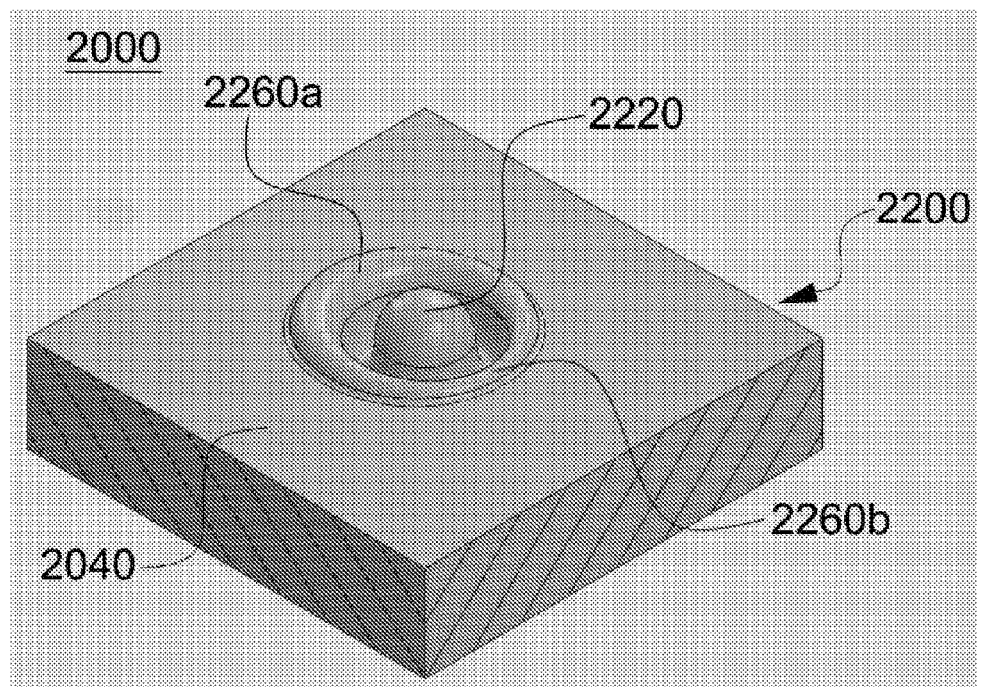
FIG. 12 is a perspective view of a first example of a reflective pattern according to an embodiment of the present invention.
Figure 13:
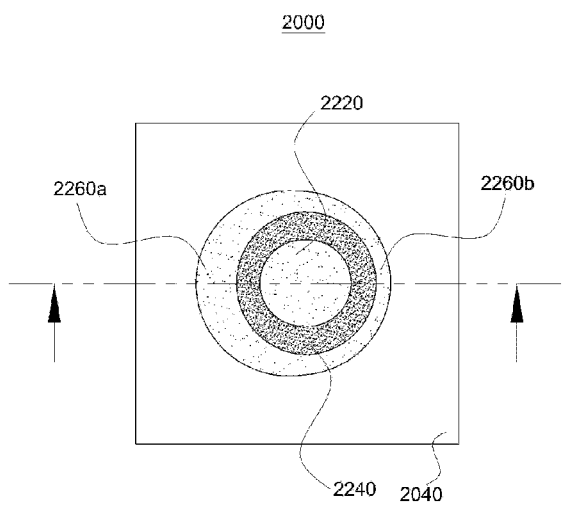
FIG. 13 is a cross-sectional view of a first example of a reflective pattern according to an embodiment of the present invention.

FIG. 12 is a perspective view of a first example of reflective patterns 2200 according to an embodiment of the present invention; FIG. 13 is a cross-sectional view of the first example of reflective patterns 2200 according to an embodiment of the present invention; and FIG. 14 is a planar view of the first example of reflective patterns 2200 according to an embodiment of the present invention.

Figure 14:
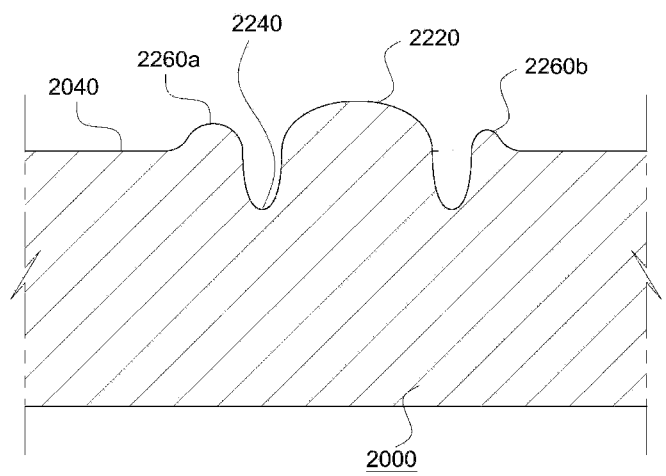
FIG. 14 is a planar view of a first example of a reflective pattern according to an embodiment of the present invention.

Referring to FIG. 12, FIG. 13 and FIG. 14, a first shape of the reflective patterns 2200 according to an embodiment of the present invention may include a central embossed portion 2220, a concave portion 2240, and an outer embossed portion 2260.

The central embossed portion 2220 is positioned at the center of the reflective patterns 2200 and is a portion protruding more toward outside than a reference surface of the reflective surface 2040. Specifically, as depicted in FIG. 12, the central embossed portion 2220 may protrude from the reflective surface 2040 in a semi-spherical shape. When viewed in a direction perpendicular to the reflective surface 2040, the central embossed portion 2220 may be formed in a circular shape, as depicted in FIG. 13. In addition, as depicted in FIG. 14, when viewed from the cross-section, the height of the central embossed portion 2220 is the greatest at the central portion and may be gradually lowered to the height equal to that of the reference surface of the reflective surface 2040 as becoming farther from the central portion. For example, when viewed from the cross-section, the central embossed portion 2220 may protrude from the reference surface of the reflective surface 2040 while forming a curved surface such as an arc, an oval arc, and a parabola. Preferably, the central embossed portion 2220 protrudes in a relatively steep slope at the edge portion, thereby progressively forming a gentle slope toward the central portion. The central embossed portion 2220 treated to have a curved surface can easily refract, scatter, and reflect wide range of incident light.

The concave portion 2240 is a portion more recessed toward inside than the reference surface of the reflective surface 2040 to surround the central embossed portion 2220. Here, as depicted in FIG. 13, the concave portion 2240 may be formed in a shape of a ring when viewed in the direction perpendicular to the reflective surface 2040. The center of a ring forming the concave portion 2240 may correspond to the center of a circle forming the central embossed portion 2220.

Here, as depicted in FIG. 14, the concave portion 2240 may have height equal to that of the reference surface of the reflective surface 2040 at an inner diameter (a border connected to the central embossed portion 2220), reach the greatest depth by the depth gradually increasing from the inner diameter up to a predetermined distance as becoming farther from the inner diameter, and have height equal to that of the reference surface of the reflective surface 2040 at an outer diameter as the depth gradually decreases as becoming closer to the outer diameter (a border connected to the outer embossed portion 2260) after reaching the greatest depth.

Here, it is possible that a flat portion with uniform depth is provided at the portion with the greatest depth. In addition, in the concave portion 2240, the slope at the inner diameter may be formed greater than the slope at the outer diameter. For example, when viewed from a cross-section, the concave portion 2240 may be recessed from the reference surface of the reflective surface 2040 while forming a curved surface such as an arc, an oval arc, and a parabola. The concave portion 2240 treated to have a curved surface can easily refract, scatter, and reflect wide range of incident light.

The outer embossed portion 2260 is positioned to surround the concave portion 2240, and is a portion more protruding toward outside than the reference surface of the reflective surface 2040.

Referring to FIG. 13, when viewed in the direction perpendicular to the reflective surface 2040, the outer embossed portion 2260 may be formed in the shape of a ring. Here, the center of the ring forming the outer embossed portion 2260 may not correspond to the center of the circle forming the central embossed portion 2220 and the center of the arc forming the concave portion 2240. Accordingly, the thickness of the ring in the outer embossed portion 2260 may be different in accordance with different positions. Here, the thickness of the ring forming the outer embossed portion 2260 may progressively decrease from a region close to the light incident surface 2060 toward a region far from the light incident surface 2060. In other words, the thickness of the ring may gradually decrease in a direction in which light is incident from the light source array 1640, i.e. a direction perpendicular to an edge in which the light source array 1640 is arranged. Accordingly, in the outer embossed portion 2260, the thickness of a region closest to the edge in which the light source array 1640 is arranged may be the greatest. In addition, in the outer embossed portion 2260, the thickness of a region farthest from the edge in which the light source array 1640 is arranged may be the smallest.

Furthermore, referring to FIG. 14, the outer embossed portion 2260 may have height equal to that of the reference surface of the reflective surface 2040 at an inner diameter (a border connected to the concave portion 2240), reach the greatest height by the height gradually increasing from the inner diameter up to a predetermined distance as becoming farther from the inner diameter, and form an outer diameter as the height becomes equal to that of the reference surface of the reflective surface 2040 by gradually decreasing after reaching the greatest height. Here, in the outer embossed portion 2260, the slope at the inner diameter may be formed greater than the slope at the outer diameter. For example, when viewed from a cross-section, the outer embossed portion 2260 may protrude from the reference surface of the reflective surface 2040 while forming a curved surface such as an arc, an oval arc, and a parabola. The outer embossed portion 2260 treated to have a curved surface can easily refract, scatter, and reflect wide range of incident light. In particular, the outer embossed portion 2260 is arranged at the outermost portion of the reflective patterns 2200 to primarily scatter light incident upon the reflective patterns 2200, enabling the light reflected by the reflective patterns 2200 to be scattered and diffused to all directions to be projected to the light output surface 2020, thereby greatly improving uniformity in luminance.

Here, the greatest protruding height of the outer embossed portion 2260 may be different in accordance with different positions. The protruding height of the outer embossed portion 2260 may progressively decrease from a region close to the light incident surface 2060 toward a region far from the same. In other words, the protruding height may gradually decrease in a direction in which light is incident from the light source array 1640, i.e. a direction perpendicular to an edge in which the light source array 1640 is arranged. Accordingly, in the outer embossed portion 2260, the protruding height of a region 2260a closest to the edge in which the light source array 1640 is arranged may be the greatest, as depicted in FIG. 14. In addition, in the outer embossed portion 2260, the protruding height of a region 2260b farthest from the edge in which the light source array 1640 is arranged may be the lowest.

The shape of the reflective patterns 2200 provided as above is asymmetrical, thereby having anisotropic optical characteristics instead of isotropic optical characteristics. Specifically, one side with great thickness and great maximum height can scatter light better than the opposite side. The opposite side can provide better field of view compared with the one side. Consequently, improving uniformity in luminance or field of view of the display device 1000 is possible if the anisotropic optical characteristics are used.

In particular, light incident from the light source array 1640 proceeds toward the opposite light surface through the light incident surface 2060. Since, in the outer embossed portion 2260, the protruding height and thickness of a side facing the light incident surface 2060 is greater than those of a side facing the opposite light surface, the maximum amount of light incident upon the light guide plate 2000 through the light incident surface 2060 to move toward the opposite light surface can be scattered, thereby enhancing the scattering effect.

Meanwhile, even though it is described hereinbefore that the outer embossed portion 2260 is asymmetrical in the first example of the reflective patterns 2200, the outer embossed portion 2260 may also be symmetrical.

Hereinafter, a second example of reflective patterns 2200 according to an embodiment of the present invention will be described.

Figure 15:
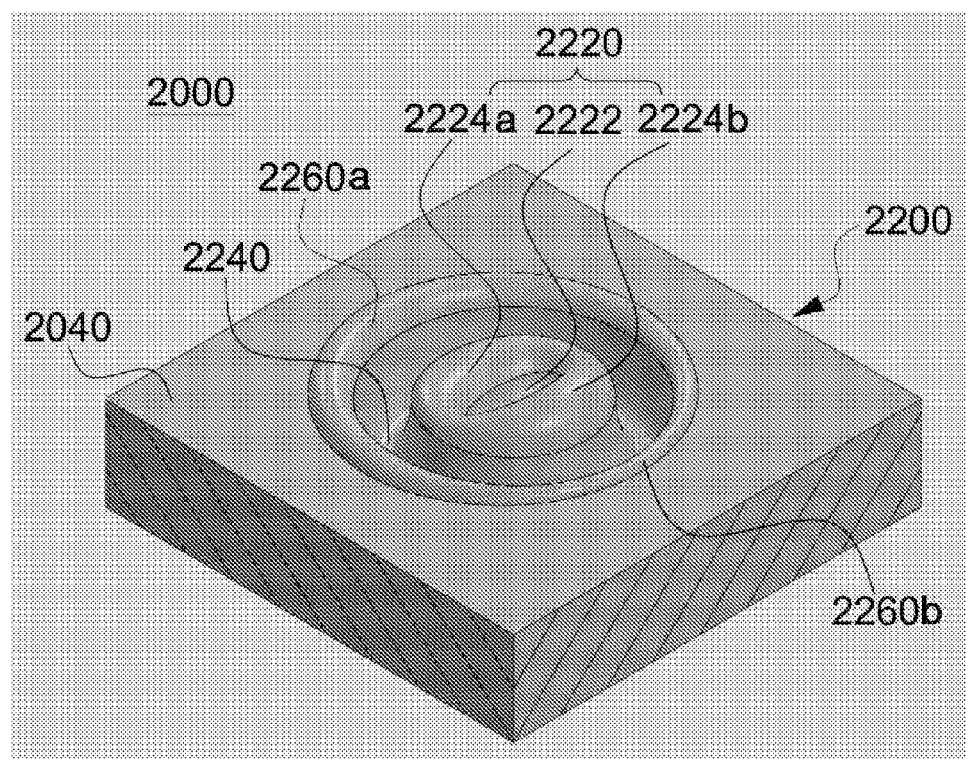
FIG. 15 is a perspective view of a second example of a reflective pattern according to an embodiment of the present invention.
Figure 16:
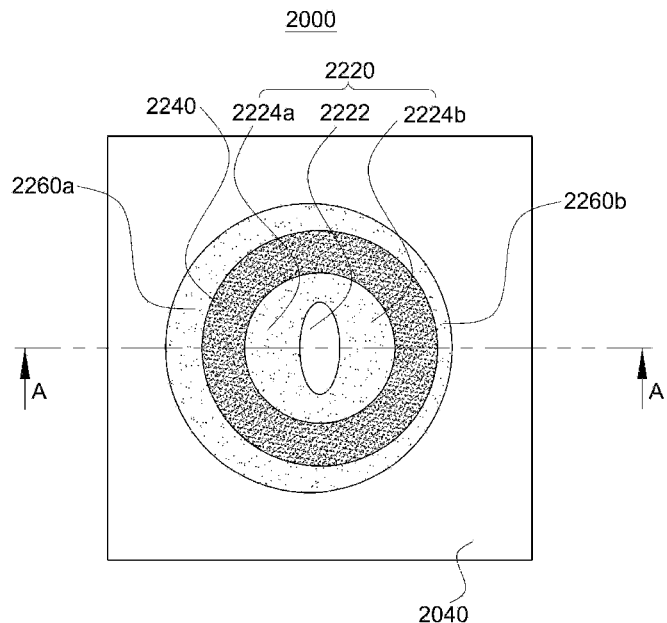
FIG. 16 is a cross-sectional view of a second example of a reflective pattern according to an embodiment of the present invention.

FIG. 15 is a perspective view of a second example of reflective patterns 2200 according to an embodiment of the present invention; FIG. 16 is a cross-sectional view of the second example of the reflective patterns 2200 according to an embodiment of the present invention; and FIG. 17 is a planar view of the second example of the reflective patterns 2200 according to an embodiment of the present invention.

Figure 17:
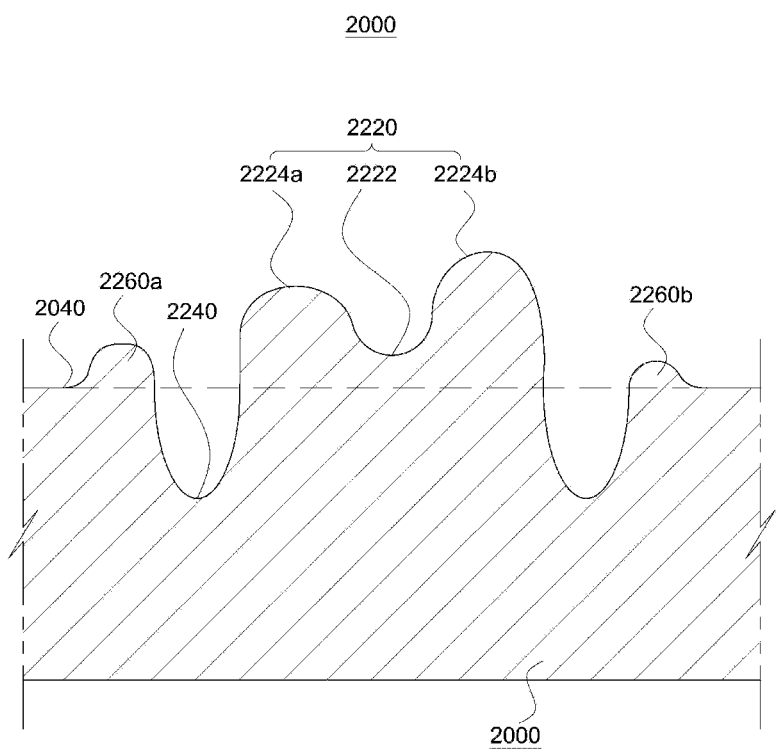
FIG. 17 is a planar view of a second example of a reflective pattern according to an embodiment of the present invention.

Referring to FIGS. 15, 16 and 17, the second example of the reflective patterns 2200 according to an embodiment of the present invention may include a central embossed portion 2220, a concave portion 2240, and an outer embossed portion 2260, similar to the first example. However, the second example of the reflective patterns 2200 may have a recessed region formed at the central embossed portion 2220.

Referring to FIG. 15, a recessed region 2222 may be formed at a central portion of the central embossed portion 2220. In the reflective patterns 2200, the recessed region 2222 may be formed by being recessed from the center of the semi-spherical central embossed portion 2220 with increased height toward the reflective surface 2040.

Referring to FIG. 16, when viewed in the direction perpendicular to the reflective surface 2040, the recessed region 2222 may be formed in an oval shape. However, the recessed region 2222 does not have to be formed in the oval shape all the time, but may be formed in any shape having a long axis and a short axis. For example, the recessed region 2222 may be formed in various shapes such as a corrugated oval shape or a long hole shape. Meanwhile, a long axis of the recessed region 2222 may be formed to pass through the center of the central embossed portion 2220. Here, the long axis of the recessed region 2222 may be formed parallel to the edge in which the light source array 1640 is arranged. That is, the long axis of the recessed region 2222 may be formed parallel to the light incident surface 2060.

Furthermore, referring to FIG. 17, the recessed region 2222 may be progressively recessed to have greater depth from the border toward the center of the reflective patterns 2200. Here, the lowest point of the recessed region 2222 may be formed higher than the reference surface of the reflective surface 2040. In addition, a flat surface may be formed at a central portion of the recessed region 2222.

The recessed region 2222 can prevent light reflected toward the center of the reflective patterns 2200 from being concentrated.

As the long axis of the recessed region 2222 is formed parallel to the light source array 1640, the central embossed portion 2220 may be divided into a region close to the light incident surface 2060 and a region far from the light incident surface 2060 with respect to the recessed region 2222.

Here, the protruding height of a region 2222b far from the light incident surface 2060 may be relatively lower than that of a region 2222a close to the light incident surface 2060. Accordingly, a region in the outer embossed portion 2260 with relatively great protruding height and a region in the central embossed portion 2220 with relatively low protruding height may be positioned in the same direction with respect to the center of the reflective patterns 2200, and likewise, a region in the outer embossed portion 2260 with relatively low protruding height and a region in the central embossed portion 2220 with relatively great protruding height may be positioned in the same direction.

Since the examples of the reflective patterns 2200 described above have anisotropic characteristics, the reflective patterns 2200 may be arranged on the reflective surface 2040 of the light guide plate 2000 considering the characteristics.

Figure 18:
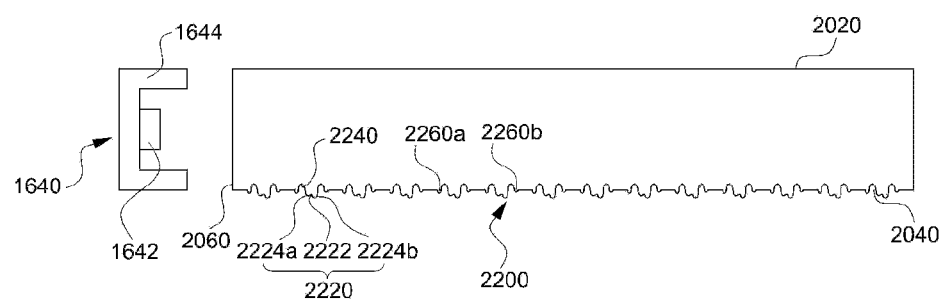
FIG. 18 is a drawing related to an arrangement of a reflective pattern according to an embodiment of the present invention.

FIG. 18 is a drawing related to arrangement of reflective patterns 2200 according to an embodiment of the present invention.

Referring to FIG. 18, a plurality of reflective patterns 2200 may be formed on the reflective surface 2040. In the outer embossed portion 2260 of the reflective patterns 2200, a region 2260a with great protruding height and thickness may be arranged close to the light incident surface 2060.

Mostly, light incident upon the light guide plate 2000 from the light source array 1640 is moved from the light incident surface 2060 toward the opposite light surface, and light entering the reflective patterns 2200 proceeds from the light incident surface 2060. Like this, by arranging the region 2260a of the outer embossed portion 2260 with great height in the light incident direction, a light diffusion effect and a light scattering effect of the outer embossed portion 2260 may be maximized.

In the reflective patterns 2200 according to an embodiment of the present invention mentioned above, in terms of a vertical distance (an absolute value of height or depth), the maximum depth of the concave portion 2240 may be the greatest, the maximum height of the central embossed portion 2220 may be the next greatest, and the maximum height of the outer embossed portion 2260 may be the smallest. Specifically, with respect to the height of the outer embossed portion 2260, the height of the central embossed portion 2220 may be approximately 1.2 to 8 times greater, and the depth of the concave portion 2240 may be approximately 2 to 14 times greater. Meanwhile, when comparing the recessed region 2222 of the central embossed portion 2220 with the outer embossed portion 2260, the height of the lowest point of the recessed region 2222 is greater than the height of the highest point of the outer embossed portion 2260. Furthermore, the depth in which the recessed region 2222 is recessed from the highest point of the central embossed portion 2220 may be approximately 0.8 to 5 times greater than the height of the outer embossed portion 2260.

Furthermore, in the reflective patterns 2200, the diameter of the central embossed portion 2220 may be approximately 60 to 85% of the whole diameter, the outer diameter of the concave portion 2240 may be approximately 80 to 98% of the whole diameter, and the outer diameter of the outer embossed portion 2260 may be approximately 85 to 100% of the whole diameter. Furthermore, in the reflective patterns 2200, the area of the recessed region 2222 compared with the area of the central embossed portion 2220, i.e. the area of a region having a negative slope in the central embossed portion 2220, may be approximately 20 to 40%.

According to one example, in the reflective patterns 2200, by a roll stamping process, the central embossed portion 2220 may have the maximum height formed in a range of 1 to 7 μm, the diameter (twice a distance from the center of the reflective patterns 2200 to a point of reaching the reference surface of the reflective surface 2040, since the distance is the radius) formed in a range of 35 to 55 μm, and the depth of the recessed region 2222, i.e. the height difference between the highest point and the lowest point of the central embossed portion 2220, formed in an approximate range of 0.3 to 4 μm, the concave portion 2240 may have the maximum height formed in a range of 2 to 13 μm and the outer diameter (twice a distance from the center of the reflective patterns 2200 to a point of reaching the reference surface of the reflective surface 2040) formed in a range of 40 to 65 μm, and the outer embossed portion 2260 may have the maximum height formed in a range of 0.5 to 5 μm and the outer diameter (twice a distance from the center of the reflective patterns 2200 to a point of reaching the reference surface of the reflective surface 2040) formed in a range of 40 to 70 μm.

Furthermore, when the reflective patterns 2200 are formed in curved surfaces, an angle of inclination of a portion connecting the concave portion 2240 to the outer embossed portion 2260 is may be the greatest, an angle of inclination of a portion connecting the central embossed portion 2220 to the concave portion 2240 may be the next greatest, and an angle of inclination of a portion connecting the outer embossed portion 2260 to the reference surface of the reflective surface 2040 may be the smallest.

Furthermore, even though it is depicted in the drawings that surfaces of the reflective patterns 2200 are smooth, the surfaces of the reflective patterns 2200 may have a predetermined value of roughness, and in particular, the concave portion 2240 and the outer embossed portion 2260 may have a value of roughness equal to or greater than a predetermined value.

However, specifications of the reflective patterns 2200 are not limited to the height, depth, diameter, angle of inclination, and value of roughness mentioned above, but may be properly modified as needed.

All reflective patterns 2200 formed at the reflective surface 2040 may substantially have the same specifications, or specifications of each of the reflective patterns 2200 may be different from each other in accordance with different portions of the reflective surface 2040 as needed. For example, if all reflective patterns 2200 are formed to have the same specifications, it is advantageous in terms of a manufacturing process, thereby saving the production cost. On the other hand, if the diameter of the reflective patterns 2200 is adjusted to become progressively smaller toward the light incident surface 2060, uniformity in luminance may be improved throughout the light output surface 2020 of the light guide plate 2000.

The exemplary embodiments of the present invention described above are disclosed for illustrative purposes, and those of ordinary skill in the art will be able to make various modifications, changes, and additions within the spirit and scope of the present invention while the modifications, changes, and additions should be construed as belonging to the scope of the patent claims below.

GLOSSARY

1000: Display device
1400: Display panel
1600: Backlight unit
2000: Light guide plate
2040: Reflective surface
2060: Light incident surface
2200: Reflective patterns
2220: Central embossed portion
2222: Recessed region
2240: Concave portion
2260: Outer embossed portion

What is claimed is:
1. A display device, comprising:
a display panel configured to output an image to a front surface of the display device;
a light source array arranged along at least one edge of the display device to output light; and
a light guide plate arranged behind the display panel to guide light incident upon a side surface facing the edge from the light source array so that the light is projected through a front surface toward the display panel,
wherein a reflective pattern for reflecting light to the front surface of the light guide plate is provided at a rear surface of the light guide plate,
the reflective pattern includes a central embossed portion protruding toward an outer portion of the rear surface; a concave portion recessed toward an inner portion of the rear surface to surround the central embossed portion; and an outer embossed portion protruding toward the outer portion of the rear surface outside the concave portion, and
the outer embossed portion is provided to have a protruding height of a region abutting the edge to be greater than those of other regions,
wherein, in the reflective pattern, when viewed from a direction perpendicular to a rear surface, the central embossed portion is formed in a circular shape, the concave portion is formed in the shape of a ring surrounding the central embossed portion, and the outer embossed portion is formed in the shape of a ring surrounding the concave portion,
wherein the center of a ring forming the concave portion corresponds to the center of a circle forming the central embossed portion, and
wherein the center of the ring forming the outer embossed portion does not correspond to the center of the circle forming the central embossed portion and the center of the ring forming the concave portion.
2. The display device of claim 1, wherein the light source array is arranged at a short side edge of the display device, and the protruding height of the outer embossed portion of the reflective pattern is changed along a long side of the display device.

3. The display device of claim 1, wherein the light source array is arranged at a long side edge of the display device, and the protruding height of the outer embossed portion of the reflective pattern is changed along a short side of the display device.

4. The display device of claim 1, wherein the protruding height of a region farthest from the edge is smaller than those of other regions in the outer embossed portion.

5. The display device of claim 1, wherein the protruding height of the outer embossed portion progressively decreases from a region abutting the edge toward a region far from the edge.

6. The display device of claim 1, wherein the thickness of a ring at a region abutting the edge is greater than the thickness of a ring at other regions in the outer embossed portion.

7. The display device of claim 1, wherein the central embossed portion comprises a recessed region formed at the central portion.

8. The display device of claim 1, wherein, density of the reflective patterns progressively increases as becoming farther from the edge.

9. The display device of claim 7, wherein the recessed region has a long axis parallel to the edge.

10. The display device of claim 9, wherein, in the central embossed portion, the protruding height of a region abutting the edge is greater than that of a region far from the edge with respect to the recessed region.

11. The display device of claim 8, wherein the density of the reflective patterns is the greatest at a corner portion of the reflective surface abutting the edge.

* * * * *